(12) United States Patent
Stubler et al.

(10) Patent No.: US 9,580,876 B2
(45) Date of Patent: Feb. 28, 2017

(54) DEVICE FOR DAMPING VIBRATIONS IN CABLES OF A SUSPENSION SYSTEM OF A CIVIL ENGINEERING STRUCTURE

(71) Applicant: SOLETANCHE FREYSSINET, Rueil Malmaison (FR)

(72) Inventors: Jerome Stubler, Paris (FR); Erik Mellier, Versailles (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 14/526,067

(22) Filed: Oct. 28, 2014

(65) Prior Publication Data

US 2015/0113744 A1    Apr. 30, 2015

(30) Foreign Application Priority Data

Oct. 31, 2013    (FR) ...................... 13 60709

(51) Int. Cl.
| | |
|---|---|
| *E01D 19/00* | (2006.01) |
| *E01D 19/16* | (2006.01) |
| *F16F 15/02* | (2006.01) |
| *E01D 11/04* | (2006.01) |

(52) U.S. Cl.
CPC .............. *E01D 19/16* (2013.01); *E01D 11/04* (2013.01); *F16F 15/02* (2013.01)

(58) Field of Classification Search
CPC ........... F15F 15/02; E01D 11/04; E01D 19/16
USPC ...................................... 14/18–23
See application file for complete search history.

(56) References Cited

U.S. PATENT DOCUMENTS

| | | | |
|---|---|---|---|
| 2,358,672 A * | 9/1944 | Vartia ..................... | E01D 19/14 14/18 |
| 3,421,167 A * | 1/1969 | Kawada ................... | E01D 11/02 14/18 |
| 4,648,147 A | 3/1987 | Zimmermann et al. | |
| 4,995,583 A | 2/1991 | De La Fuente | |
| 6,334,608 B1 | 1/2002 | Stubler | |
| 7,264,095 B2 | 9/2007 | Domange | |
| 7,631,384 B2 | 12/2009 | Lecinq et al. | |
| 9,009,899 B2 * | 4/2015 | Schnitzler ............... | E01D 19/14 14/22 |
| 9,021,644 B2 * | 5/2015 | Kawabata ............... | E01D 11/04 14/22 |
| 2002/0104175 A1 * | 8/2002 | Zivanovic ............... | E01D 19/16 14/22 |
| 2005/0072895 A1 | 4/2005 | Messein et al. | |

(Continued)

FOREIGN PATENT DOCUMENTS

| | | |
|---|---|---|
| DE | 29517250 U1 | 12/1995 |
| EP | 0343054 A1 | 11/1989 |

(Continued)

*Primary Examiner* — Raymond W Addie
(74) *Attorney, Agent, or Firm* — Dentons US LLP

(57) ABSTRACT

The damping device comprises an interconnecting structure between cables of a group of at least three cables of the suspension system which extend substantially in one and the same suspension plane P. The interconnecting structure has, outside the plane P, at least one bearing point for an energy dissipating element arranged so as to develop a damping force in response to a movement of one of the cables of the group relative to the other cables of the group in a direction perpendicular to the suspension plane.

12 Claims, 4 Drawing Sheets

(56) References Cited

U.S. PATENT DOCUMENTS

2011/0277252 A1* 11/2011 Stubler ................ E01D 19/16
                                                                           14/22
2016/0273174 A1    9/2016  Stubler et al.

FOREIGN PATENT DOCUMENTS

| EP | 2386689 A1 | 11/2011 |
|----|------------|---------|
| FR | 2664920 A1 | 1/1992 |
| FR | 2854217 A1 | 10/2004 |
| FR | 2859260 A1 | 3/2005 |
| FR | 2862073 A1 | 5/2005 |
| JP | 6-58369 A | 3/1994 |
| JP | 6-58370 A | 3/1994 |
| JP | 9-59921 A | 3/1997 |
| JP | 11-172618 A | 6/1999 |
| JP | 2000136508 A | 5/2000 |
| WO | 9804780 A1 | 2/1998 |
| WO | 2015059413 A1 | 4/2015 |

* cited by examiner

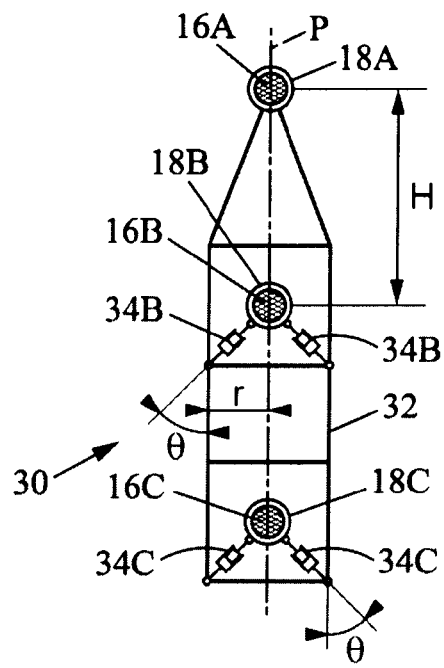
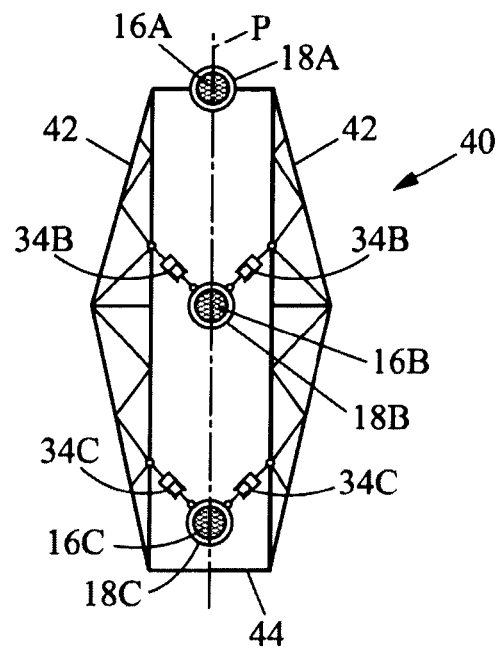
FIG. 4     FIG. 5
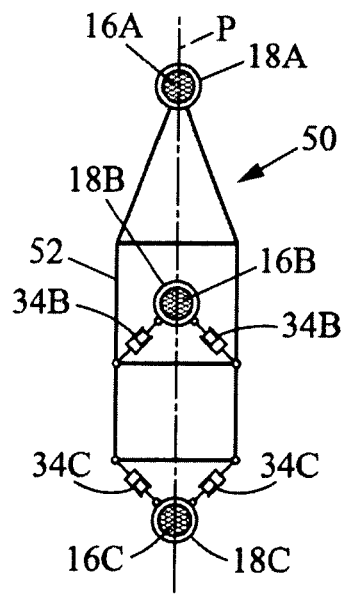
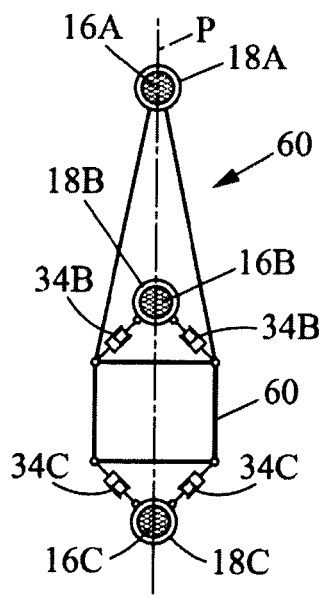
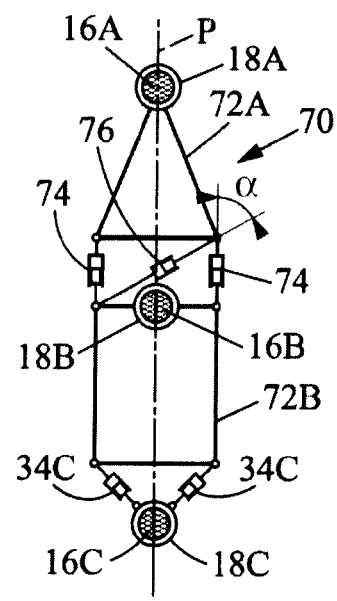
FIG. 6     FIG. 7     FIG. 8

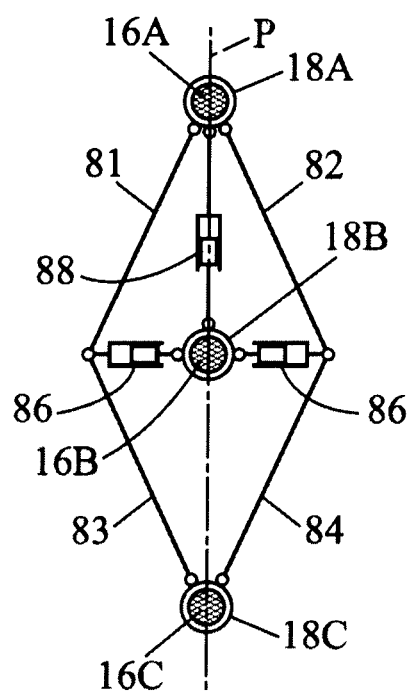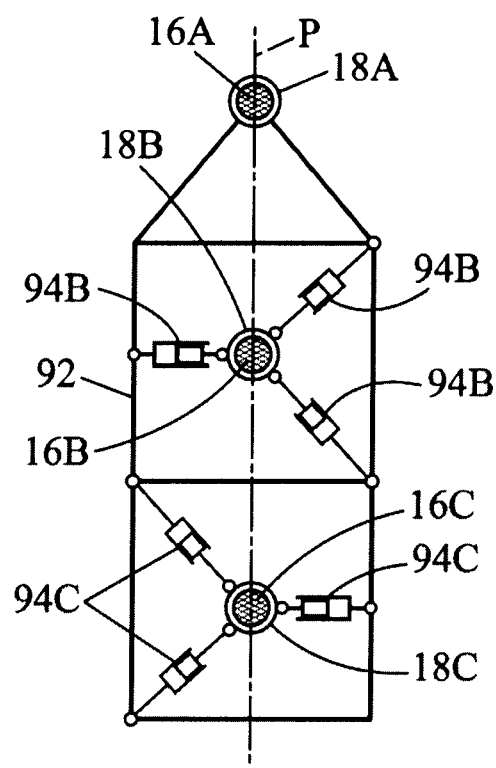
FIG. 9
FIG. 10

DEVICE FOR DAMPING VIBRATIONS IN CABLES OF A SUSPENSION SYSTEM OF A CIVIL ENGINEERING STRUCTURE

This application claims priority to French Application No. FR 13 60709 filed Oct. 31, 2013, which is hereby incorporated by reference in its entirety.

The present invention relates to techniques for damping vibrations to which cables used for suspending civil engineering structures are subjected.

BACKGROUND

It applies notably to cable-stayed suspensions of bridges. The stays vibrate notably on account of the wind and the movement of vehicles. Different types of device have been proposed for damping these vibrations.

In a first type of damping device (see for example EP 0 343 054 A1, DE 295 17 250 U1 or WO 98/04780 A1), the vibrational energy is dissipated around an individual cable, in a zone delimited radially by an element fixed to the suspended structure. This element may be an arm extending between the cable and the suspended structure, or a tube that holds the lower part of the cable.

Further devices use linear-stroke dampers such as hydraulic cylinders. One or more cylinders may be disposed on one or more arms that connect an individual cable to the suspended structure (see for example JP 09-59921 A) or between the cable and a tube that is fixed to the suspended structure and contains the lower part of the cable (see for example FR 2 859 260 A1 or JP 06-58370 A).

A damping device referred to as a pendular damping device has an oscillating arm connected to the cable, the oscillations of which are damped by viscous friction. FR 2 664 920 A1 describes an example of such a pendular device.

The abovementioned damping devices have the limitation of having to be disposed in the vicinity of the suspended structure, i.e. close to the anchoring point of the cable, typically at a distance that represents 1 to 3% of the total length of the cable.

FR 2 862 073 A1 describes another type of damping device which connects the cable not to a fixed point on the suspended structure but to an adjacent cable. Since the stays of a cable-stayed bridge generally have different lengths, they all have different natural frequencies of vibration. Consequently, during a vibrational episode, there is always a relative movement between the cables. The damping device according to FR 2 862 073 A1 takes advantage of this relative movement in order to dissipate the energy. The adjacent cable thus represents a pseudo fixed point for the vibrating cable.

Although this pseudo fixed point is less effective than an actual fixed point such as the deck of the cable-stayed bridge, these devices are nevertheless very effective, since they can be positioned relatively far away from the anchoring point of the cable, typically 5 to 10% of the total length.

However, this damping device has the limitation of only acting in the plane of the cables that it connects, i.e. in the plane of the plane of stays. Movements out of the plane (transverse movements) are not effectively damped.

In order to combat vibrations of a plane of stays, another method consists in installing cables interconnecting the stays, said cables stiffening the plane of stays transversely and preventing the stays from adopting certain vibrational modes. Although the interconnecting cables can be designed to damp the vertical vibrations in order to supplement the individual damping applied at the root of the stays, they remain virtually without effect on the transverse vibrations.

An object of the present invention to propose a device for damping vibrations in cables, such as the stays of a bridge, which is highly effective in particular for damping transverse vibrations.

SUMMARY

A device for damping vibrations in cables of a suspension system of a civil engineering structure is proposed. The damping device comprises an interconnecting structure between cables of a group of at least three cables of the suspension system which extend substantially in a common suspension plane. The interconnecting structure has, outside the suspension plane, at least one bearing point for an energy dissipating element arranged so as to develop a damping force in response to movement of one of the cables of the group relative to the other cables of the group in a direction perpendicular to the suspension plane.

The device affords the capacity of damping the transverse vibrations of the cables while having freedom in positioning the interconnecting structure along these cables. It can thus be placed at a location where damping will be effective.

The group of cables connected by the interconnecting structure is made up of three or more cables. If there were only two cables in this group, the transverse damping would not be effective. Since the interconnecting structure has a certain transverse size, it is preferable for it not to cover too many cables on account of the weight that it would risk having and also for aesthetic reasons. Thus, the preferred number of cables in the group will often be three.

In one embodiment of the damping device, the interconnecting structure includes at least one linear-stroke damper oriented transversely to the suspension plane. There will often be a plurality of linear-stroke dampers that are not mutually parallel in the interconnecting structure.

In order to obtain sufficient spacing for effective action of the energy dissipating element or elements, the bearing point thereof in the interconnecting structure is preferably located at a distance from the suspension plane of greater than one fortieth of the spacing between two adjacent cables of the suspension system at the interconnecting structure. This distance between the bearing point and the suspension plane can notably be greater than one tenth of the spacing between cables.

In one advantageous design of the damping device, the interconnecting structure is configured to allow displacements of each cable of the group perpendicularly to itself in the suspension plane and out of the suspension plane when the positions of the other cables of the groups are fixed. This avoids constraining the cable trajectories.

In such a design, it is possible to ensure that each of said displacements actuates at least one energy dissipating element. One and the same device thus damps the vibrations in the cables of the group in the different possible directions.

It is also possible to provide that a movement parallel to the cables of the connecting points of the interconnecting structure to the cables, for example on account of expansions or contractions of the cables in the event of temperature variations, be allowed.

The interconnecting structure can be carried by at least one of the cables of the group without damping elements being interposed. In particular, in order to obtain good stability, the interconnecting structure can be carried by a cable of the group that is located above the centre of gravity of the interconnecting structure, such as the highest cable of the group.

Another aspect of the present invention relates to a cable-stayed bridge, comprising at least one tower, a deck, at least one set of stays consisting of cables extending obliquely in a suspension plane between one side of the tower and the deck in order to suspend the deck, and at least one damping device as defined above, fitted on a group of at least three stays of the set.

All of the stays to be damped, i.e. in general at least the longest stays of the set belong to at least one group on which a damping device is fitted. It is possible for some of the stays to belong to a plurality of groups, each having its own damping device.

BRIEF DESCRIPTION OF THE DRAWINGS

Further features and advantages of the present invention will become apparent from the following description of nonlimiting exemplary embodiments, with reference to the appended drawings, in which:

FIGS. 4 to 10 are schematic sectional views, in a plane perpendicular to the direction of the stays, of examples of damping devices according to the invention.

DESCRIPTION OF EMBODIMENTS

Figure 1:
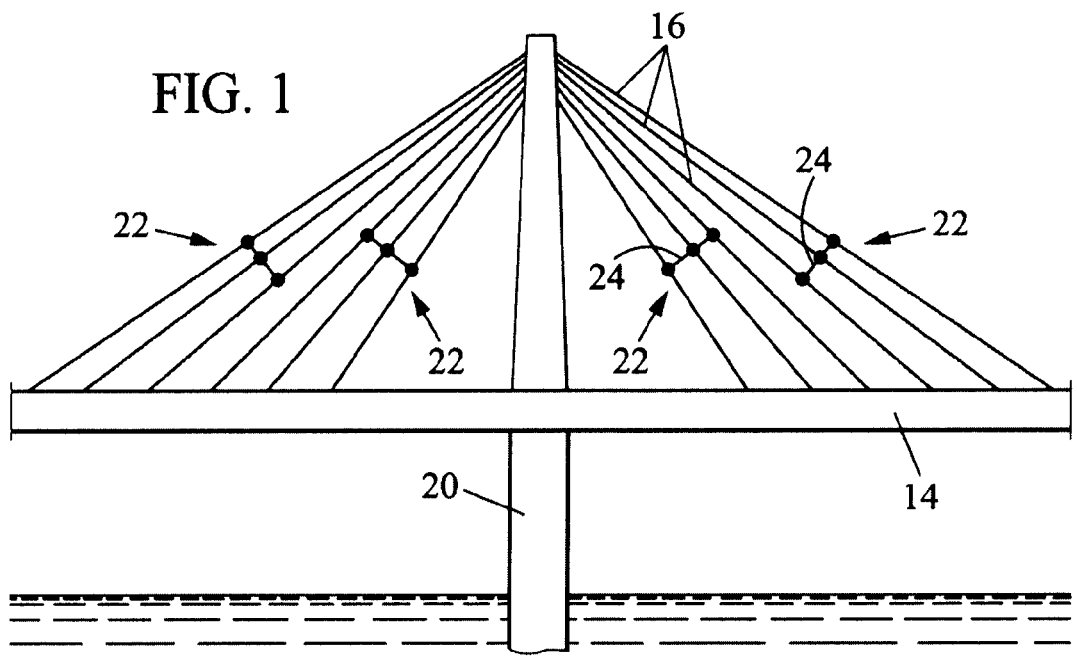
FIG. 1 is a profile diagram of a cable-stayed bridge using damping devices according to the invention.

The invention is described in the following text in terms of its application to the suspension systems of cable-stayed bridges. The cables which are intended to damp the vibrations are thus the stays 16 which extend between a tower 20 of the bridge and its deck 14 in order to suspend the deck 14. In the illustration in FIG. 1, there are two sets of stays 16 disposed symmetrically on either side of the tower 20. However, in practice, there is very often asymmetry between the two sides of a tower of a cable-stayed bridge.

The set of stays 16 extends in a vertical or slightly inclined plane between the tower 20 and the deck 14. Each stay 16 has its bottom end anchored to the deck 14 and its top end connected to the tower 20 either by another anchoring apparatus or by a deflecting saddle.

It is possible to equip all or some of the stays 16, near to their bottom ends, with individual damping devices (not shown), for example of the type described in the publications mentioned in the introduction, or else in the international patent application No. PCT/FR2014/052693.

In order to contribute to damping vibrations in the stays 16 of a set, the set is equipped with one or more devices 22, each comprising an interconnecting structure 24 that connects a plurality of adjacent stays together.

These devices 22 are used to damp vibrations to which the stays are subjected perpendicularly to their path on account of relative displacements of their anchoring means, or on account of aerodynamic effects. In particular, it is intended to damp the vibrations in the stays 16 perpendicularly to the plane of the set of stays.

Figure 2:
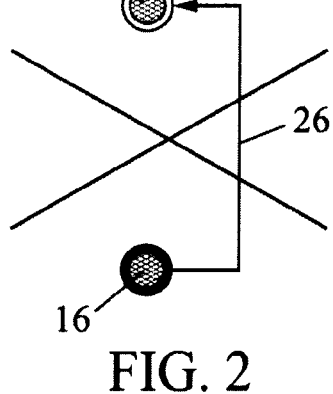
FIGS. 2 and 3 are diagrams presented to illustrate the principle of operation of the damping device according to the invention.
Figure 3:
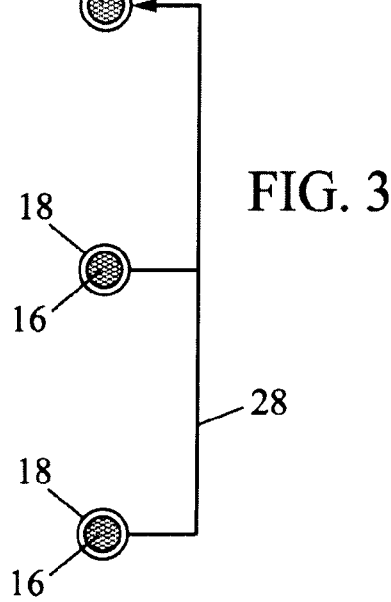

Transverse damping requires application of a damping force F to the cable 16, out of the plane of the set of stays, by bearing on the other cables (FIGS. 2 and 3). Fixing the interconnecting structure 24 to a single adjacent cable 16, counting on the torsional rigidity of this cable (FIG. 2), is neither effective nor practical to realize, since a cable has little torsional rigidity, and it is also often covered with a sheath that adheres weakly, if at all, to the cable.

The interconnecting structure 24 should thus bear simply, for example by way of a collar 18 that is free to rotate but is fixed along the cables, against at least two adjacent cables 16 (FIG. 3) so as to create a return effect. Since the two cables have different lengths and thus different transverse natural frequencies, they create a pseudo-inset for the third cable to be damped transversely.

The damping device 22 thus uses a structure 24 which connects together at least three cables, typically three adjacent cables of the set of stays. This interconnecting structure 24 extends significantly out of the plane of the set of stays in order to have a certain transverse structural rigidity. The term "significantly" should be understood as meaning that at least one of the components of the structure 24, other than the collars for connecting to the cables, is oriented out of the plane of the set of stays.

The transverse dimension of the interconnecting structure 24 exceeds one twentieth of the minimum spacing between the cables 16 of the group of three. It will typically be greater than one fiftieth of this spacing.

The interconnecting structure 24 comprises both rigid structural members, typically steel members, and energy dissipating elements, typically frictional and/or viscous elements or one or more structural elements made of a material having high internal damping.

In one representative embodiment, one or more hydraulic cylinders, with symmetric action or asymmetric action (see EP 2 386 689 A1), are used as viscosity energy dissipating elements. These cylinders can optionally incorporate a spring in order to obtain elastic return in addition to the damping.

In order to withstand gravity, the interconnecting structure 24 is carried by at least one cable 16 of the group of three without damping elements being interposed.

In order not to hinder the slow movements of the cables, in particular those on account of thermal variations, it is preferable for the interconnecting structure 24 not to rigidly connect two cables of the group. If it is fixed rigidly between two cables 16, the vertical spacing between these two cables 16 is frozen and deviations can be imposed on the cables which it would be preferable to avoid.

In order that the interconnecting structure 24 has good stability, the preferred mode of fixing is suspension from a cable 16 located above the centre of gravity of the structure. This will typically be the highest cable of the group.

Numerous configurations of the interconnecting structure 24 are possible. FIGS. 4 to 10 schematically show examples thereof which meet the following conditions:

- the interconnecting structure connects three or more cables together;
- it is carried in a stable manner, without interposition of damping elements, by at least one cable;
- any cable of the group of cables that are connected together has a capacity of moving perpendicularly to itself (i.e. in the plane of FIGS. 4 to 10), in the plane P of the set of stays and out of this plane P, when the positions of the other cables of the group are considered to be fixed;
- this movement of one of the cables relative to the others gives rise to the actuation of at least one energy dissipating element in the interconnecting structure.

In the examples in FIGS. 4 to 10, the groups are made up of three adjacent cables 16A, 16B, 16C of the set of stays. It should be noted that these could also be non-adjacent cables. The function of carrying the interconnecting structure is carried out by way of the collar 18A for fixing to the top cable 16A of the group.

In the example in FIG. 4, the interconnecting structure 30 has a symmetrical shape on either side of the plane P of the set of stays. It comprises a rigid frame 32 suspended from the top stay 16A of the group by way of its collar 18A. Each of the two other stays 16B, 16C of the group is respectively connected to the frame 32 by way of a collar 18B, 18C and a pair of hydraulic cylinders 34B, 34C.

The cylinders 34B, 34C are disposed symmetrically on either side of the plane P, and their axis forms an angle θ, at rest, of between 0° and 90° therewith, e.g. θ≈45°. They are connected in an articulated manner on one side to the collar 18B, 18C fitted on the respective stay 16B, 16C, and on the other side to a respective point of the frame 32 that is located at a distance r from the plane P. This distance r is typically less than $1/40^{th}$ of the spacing H between two adjacent stays of the group at the interconnecting structure 30. In order to obtain a damping force F with a relatively high amplitude transversely to the set of stays, it is advantageous for this distance r to be greater than H/10.

In FIG. 4, when the stays 16A and 16C are fixed, the cylinders of the pair 34B damp the vibrations of the stay 16B in both directions. Similarly, when the stays 16A and 16B are fixed, the cylinders of the pair 34C damp the vibrations of the stay 16C in both directions.

When the stays 16B and 16C are fixed, the vertical vibrations of the stay 16A are damped by the joint response of the cylinders 34B, 34C to extension or contraction, while the horizontal vibrations thereof are damped in a differential manner by the two cylinders of each pair 34B, 34C.

FIG. 5 shows a variant of the damping device from FIG. 4, wherein the frame of the interconnecting structure 40 has two reinforced members 42 that extend parallel to one another on either side of the plane P of the set of stays and perpendicularly to the three stays of the group. At the top end, the two members 42 are connected rigidly to the collar 18A fixed to the top stay 16A. A bar 44 connects the two members 42 in the bottom part of the interconnecting structure 40.

The pairs of hydraulic cylinders are disposed in a similar manner to those in FIG. 4, with the exception that the cylinders 34B, 34C extend upwardly and not downwardly from the stays 16B, 16C to which they are respectively connected.

FIGS. 6 and 7 show two other embodiments of the interconnecting structure 50, 60, which differ from those in FIGS. 4 and 5 by the shape of the frame 52, 62, the arrangement of the energy dissipating elements 34B, 34C being similar.

In the example in FIG. 8, the interconnecting structure 70 has two rigid frames 72A, 72B that are respectively suspended from the cables 16A, 16B. Two hydraulic cylinders 74 disposed symmetrically with respect to the plane P of the set of stays connect the two frames 72A, 72B together. Another, transversely disposed hydraulic cylinder 76 connects the top frame 72A to the bottom frame 72B. The angle α between the axis of this transverse cylinder 76 and the vertical plane P is for example around 60°.

The vibrations of the internal stay 16C of the group are damped by a pair of hydraulic cylinders 34C disposed in the bottom part of the frame 72B with an arrangement similar to that in FIGS. 5 to 7. The vertical component of the relative movement between the stays 16A and 16B is essentially damped by the effect of the cylinders 74, with an additional contribution by the transverse cylinder 76. The horizontal component of the relative movement between the stays 16A and 16B is essentially damped by the effect of the transverse cylinder 76, with an additional contribution by the cylinders 74.

In the exemplary embodiment in FIG. 9, the interconnecting structure 80 has an assembly of four link rods 81, 82, 83, 84 that are articulated in a rhombus shape. The articulation point between the upper link rods 81, 82 is at the collar 18A fixed to the top stay 16A of the group, while the articulation point between the lower link rods 83, 84 is at the collar 18C fixed to the bottom stay 16C. The respective outer ends of two hydraulic cylinders 86 that are disposed symmetrically about the plane P of the set of stays are also articulated at the two other articulation points of the rhombus-shaped assembly, the opposite ends of said hydraulic cylinders 86 being connected to the collar 18B fixed to the central stay 16B of the group. In order to complete the interconnecting structure 80, a third hydraulic cylinder 88 is mounted in an articulated manner between the collars 18A, 18B fixed to the stays 16A, 16B.

In this exemplary embodiment, the relative vertical displacements of the central stay 16B actuate the damper 88. For all the other displacements, the articulated link rods 81, 82, 83, 84 deform the rhombus shape and actuate at least the cylinders 86.

FIG. 10 shows another example of a damping device, wherein the interconnecting structure 90 has a rigid frame 92 suspended from the top stay 16A of the group. Each of the two other stays of the group is connected to the frame 92 by way of three respective hydraulic cylinders 94B, 94C that have different orientations transversely with respect to the plane P of the set of stays.

By studying the examples in FIGS. 4 to 10, it will be realized that there are very numerous possible arrangements of the interconnecting structure. These examples are given by way of nonlimiting indication. In a specific case, the designer of the suspension system of the civil engineering structure will dimension the interconnecting structures and the energy dissipating elements depending on the general calculation of the structure and the stresses to which it may be subjected. The details for producing the interconnecting structure can also be adjusted depending on aesthetic and aerodynamic considerations which are out of the scope of the present specification.

The positions of the damping devices according to the invention on a set of stays of the suspension system of a civil engineering structure may also be very varied. It is one of the advantages of the present invention is that it affords great flexibility in the arrangement of such devices. A few alternative arrangements are illustrated in FIGS. 11 and 12.

Figure 11:
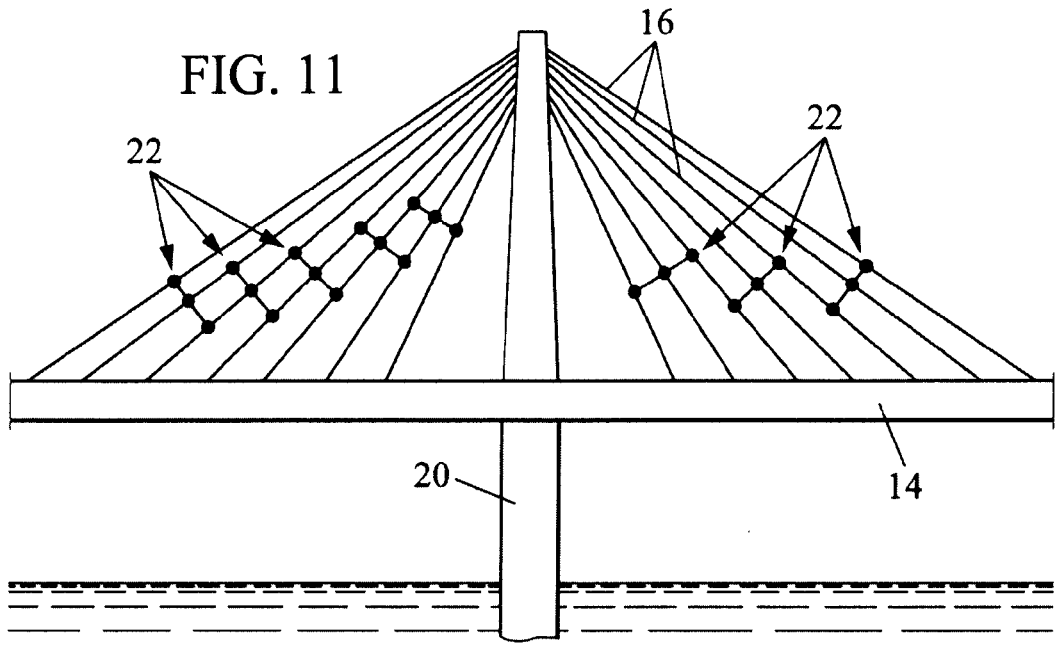
FIGS. 11 and 12 are profile diagrams of cable-stayed bridges having further possible arrangements of damping devices.

In FIG. 11, the interconnecting structures of the damping devices 22 connect the stays 16 three-by-three. While, in FIG. 1, the groups of stays connected by one damping device 22 consisted of separate stays, these groups have mutual overlaps in the case of FIG. 11. Some of the stays 16 of the set of stays thus belong to a plurality of groups. In the right-hand part of FIG. 11, the adjacent groups share one stay, while in the left-hand part, the adjacent groups share two stays.

Figure 12:
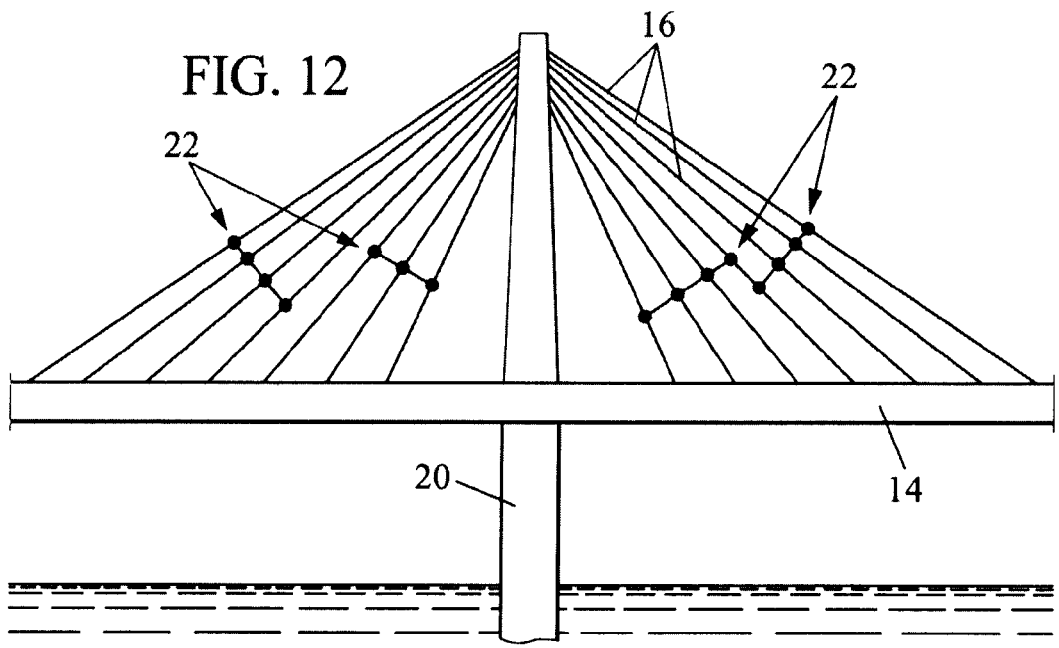

FIG. 12 shows sets of stays provided with damping devices 22 that connect more than three stays 16.

In the right-hand part of FIG. 12, the groups consist of four stays, and the adjacent groups share one stay.

In the embodiment illustrated in the left-hand part of FIG. 12, there are damping devices 22 for groups of three stays and further devices 22 for groups of four stays.

The make-up of the groups of stays 16 equipped with a device according to the invention can be highly varied and, along these stays, the damping devices 22 can be placed in any desired position depending on the overall structure of the bridge and the stresses to which it is subjected.

The embodiments described and mentioned above are illustrations of the present invention. Various modifications can be made thereto without departing from the scope of the invention which will become apparent from the appended claims.

The invention claimed is:

1. A device for damping vibrations in cables of a suspension system of a civil engineering structure, the damping device comprising:
   an interconnecting structure between cables of a group of at least three cables of the suspension system which extend substantially in a common suspension plane,
   wherein the interconnecting structure has at least one bearing point outside the suspension plane and an energy dissipating element bearing on said bearing point and arranged so as to develop a damping force in response to movement of one of the cables of the group relative to the other cables of the group in a direction perpendicular to the suspension plane.

2. The damping device of claim 1, wherein the interconnecting structure includes at least one linear-stroke damper oriented transversely to the suspension plane.

3. The damping device of claim 1, wherein the interconnecting structure comprises a plurality of linear-stroke dampers that are not mutually parallel.

4. The damping device of claim 1, wherein the interconnecting structure includes at least one hydraulic cylinder.

5. The damping device of claim 1, wherein said bearing point is located at a distance from the suspension plane of greater than one fortieth of the spacing between two adjacent cables of the suspension system at the level of the interconnecting structure.

6. The damping device of claim 5, wherein the distance between the bearing point and the suspension plane is greater than one tenth of said spacing.

7. The damping device of claim 1, wherein the interconnecting structure is configured to allow displacements of each cable of the group perpendicularly to itself in the suspension plane and out of the suspension plane when the positions of the other cables of the groups are fixed.

8. The damping device of claim 7, wherein each of said displacements actuates at least one energy dissipating element.

9. The damping device of claim 1, wherein the interconnecting structure is carried by at least one of the cables of the group without damping elements being interposed.

10. The damping device of claim 9, wherein the interconnecting structure is carried by a cable of the group that is located above the centre of gravity of the interconnecting structure.

11. The damping device of claim 10, wherein the interconnecting structure is carried by the highest cable of the group.

12. The damping device of claim 1, wherein said group of cables is made up of exactly three cables.

* * * * *